United States Patent Office

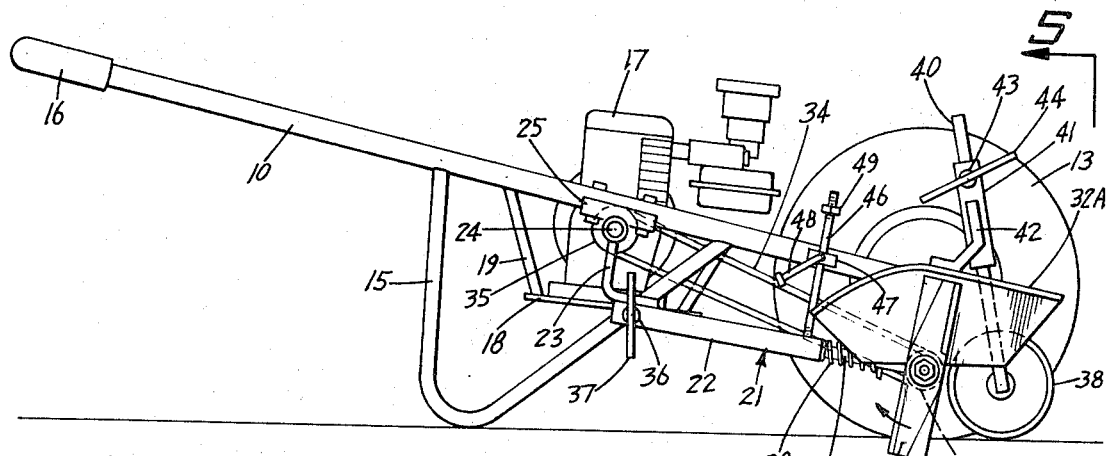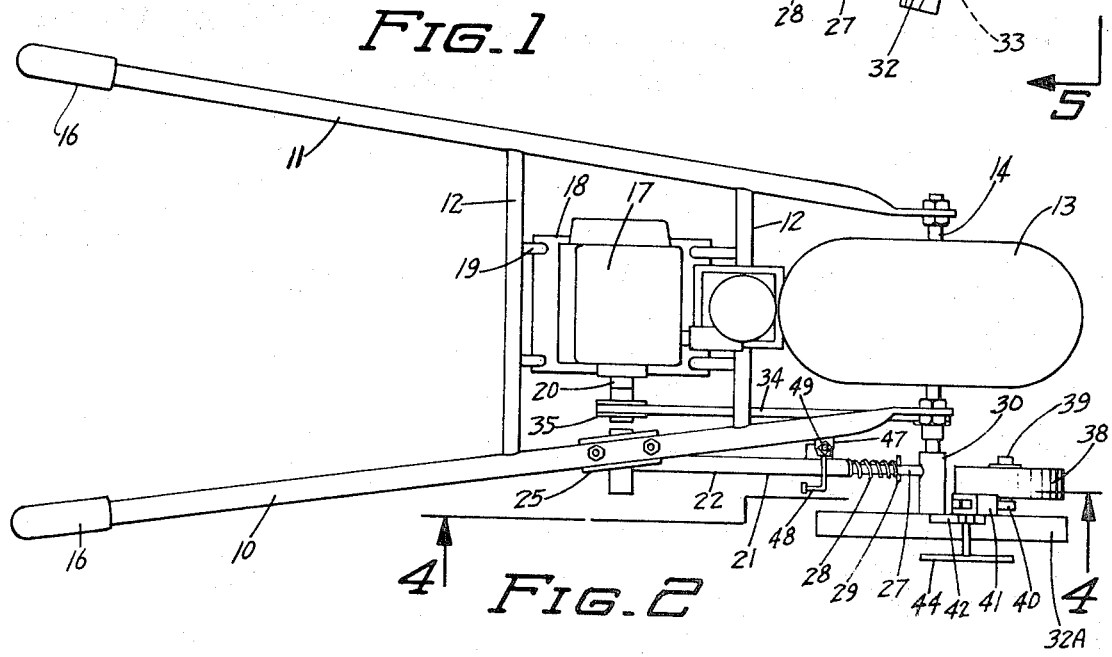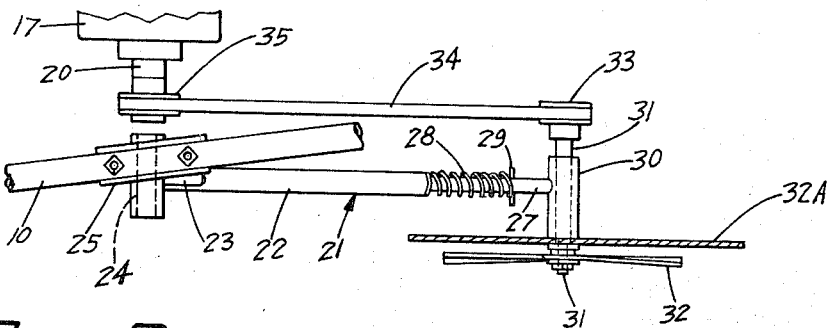

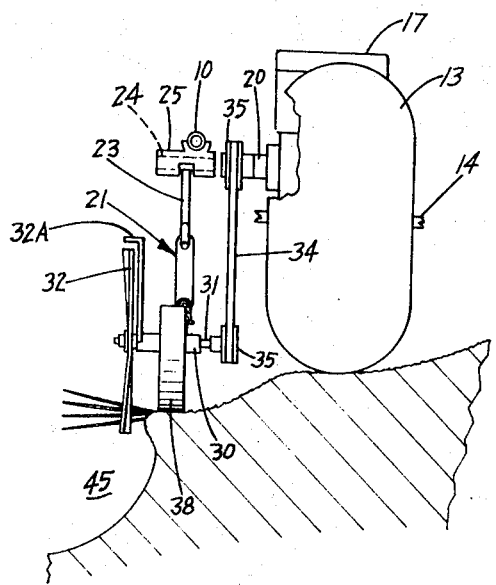
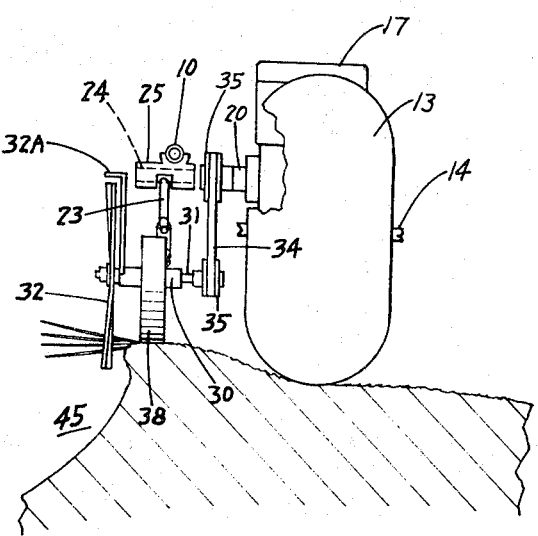
FIG. 6
FIG. 7
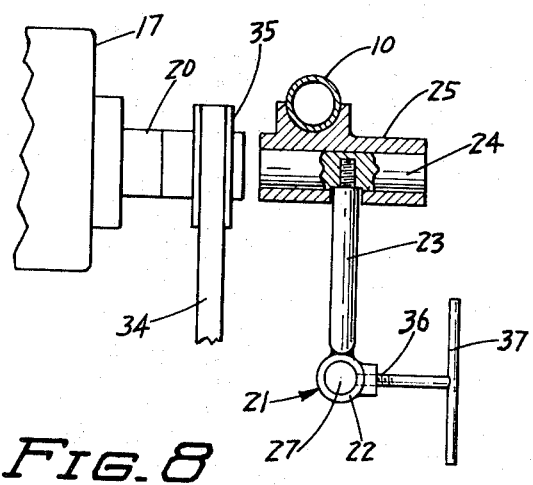
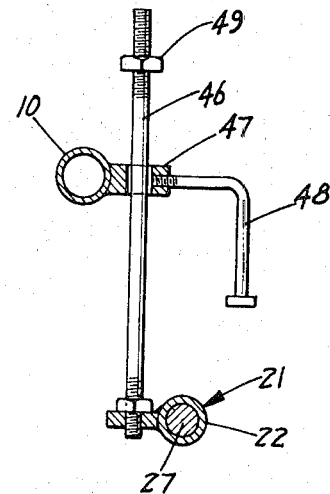
FIG. 8
FIG. 9
INVENTORS
WALTER W. GUNN
JOHN L. KOLB

3,533,223
Patented Oct. 13, 1970

3,533,223
SAND TRAP TRIMMER WITH FLOATABLE
BLADE-CARRYING ARM
Walter W. Gunn, 15539 Larch St. NW., Rte. 5, Anoka, Minn. 55303, and John L. Kolb, 5521 23rd Ave. S., Minneapolis, Minn. 55417
Filed Apr. 12, 1968, Ser. No. 720,967
Int. Cl. A01g 3/06
U.S. Cl. 56—25.4                                          6 Claims

ABSTRACT OF THE DISCLOSURE

A portable self-powered wheelbarrow-like machine for trimming grass from the edges of golf course sand traps, flower beds, driveways and the like. The machine is characterized by a single traction wheel for easy maneuverability and a cutting blade rotatable in a vertical plane carried at the end of a floating arm which is independently pivotally movable to adjust to variations in terrain. A guide wheel carried at the end of the floating arm adjacent the cutting blade causes relative vertical movement of the blade.

---

This invention relates to a machine for trimming grass from the edges of golf course sand traps, and the like. Although designed and especially adapted for trimming grass around sand traps, it is equally useful for trimming grass around flower beds, edges of driveways, walks, paths, ditches, etc. and similar locations where grass lawns abut non-grass areas which are at a slightly lower level such that the grass tends to grow outward over the edge. The trimmer is a portable wheelbarrow-like machine adapted to be guided by an operator walking behind it and manually guiding it along the edge to be trimmed. The machine has a cutting knife or blade which rotates in a generally vertical plane.

Prior sand trap trimmers have been multi-wheeled machines having a cutting blade rotatable in a vertical plane. Their wheels are fixed relative to one another such that the points at which they touch the ground lie in a plane perpendicular to the plane of the cutting blade. Such machines have the disadvantage that, when used on irregular or rough terrain, the angle and position of the cutting blade as determined by contact of the wheels with the ground is such that the cutting blade may be either cutting into the turf or sod, or missing the grass completely.

The principal object of the present invention is to provide an easily maneuverable sand trap trimmer having a single traction wheel and in which the cutting blade is movable vertically independently of the traction wheel so as to readily adjust to variations in terrain to maintain the cutting blade always in proper trimming position relative to the edge of the turf.

The invention is illustrated by the accompanying drawings in which the same numerals refer to corresponding parts and in which:

FIG. 1 is a right hand elevation of the sand trap trimmer according to the present invention;

FIG. 2 is a top plan view of the entire machine;

FIG. 3 is a fragmentary top plan view on an enlarged scale shown with parts broken away to reveal underlying structure;

FIGS. 6 and 7 are somewhat schematic front elevations showing the relative positions of parts on irregular terrain;

FIG. 8 is a fragmentary vertical section on an enlarged scale taken on the line 8—8 of FIG. 4 and in the direction of the arrows; and FIG. 9 is a fragmentary vertical section on an enlarged scale taken on the line 9—9 of FIG. 4 and in the direction of the arrows.

Figure 4:
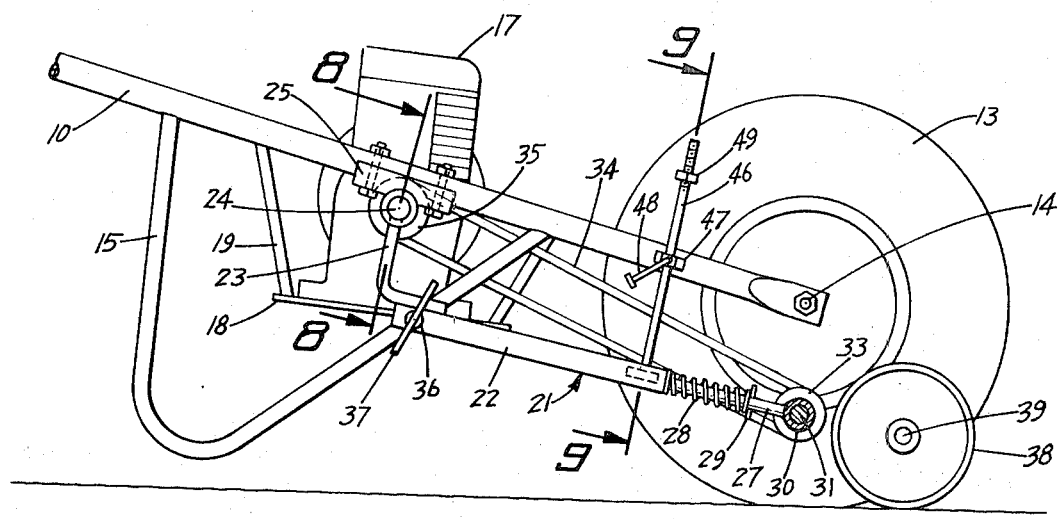
FIG. 4 is a fragmentary elevation similar to FIG. 1 but on an enlarged scale and with parts broken away along the line 4—4 of FIG. 2 to reveal underlying structure.

Referring now to the drawings, and particularly to FIGS. 1, 2, 4 and 5, the sand trap trimmer, according to the present invention, includes a wheelbarrow-like frame having an elongated right hand side bar 10 and a corresponding elongated left hand side bar 11 spaced therefrom. A pair of parallel spaced apart front and rear cross bars 12 (FIG. 2) span and connect the side bars 10 and 11. A single traction wheel 13 is journaled to rotate on or with an axle 14 carried by the forward ends of the side bars 10 and 11. A pair of legs 15 depend from side bars 10 and 11 to support the side bars in conjunction with traction wheel 13, the side bars extending generally angularly upwardly and outwardly from axle 14. Hand grips or handles 16 are provided at the rearward ends of side bars 10 and 11.

Power means, such as a one cycle gasoline engine 17, is supported on a motor platform 18 which is suspended by means of struts 19 from the cross bars 12. Motor 17 has a power takeoff in the form of a drive shaft 20 which rotates on a horizontal axis extending transverse of the frame perpendicular to the longitudinal axis of the machine.

The sand trap trimmer, according to the present invention, is characterized by a floating arm, indicated generally at 21, including a tubular portion 22 which is connected by an elbow 23 formed from rod welded or otherwise secured to the tubular portion 22. The floating arm elbow 23 is secured to a pivot shaft 24 which is journaled in a bushing in casting 25 secured to the right hand side bar 10. Shaft 25 is journaled to pivot on the axis of the power takeoff drive shaft 20 although spaced from the drive shaft and independently rotatable. A slot 26 in the bottom half of casting 25 permits limited pivotal rotation of elbow 23.

Floating arm 21 also includes a rod member 27 telescoped within tube 22 and spring loaded by means of a surrounding coil spring 28, one end of which bears against the forward end of tube 22 and the other end of which bears against a stop, such as pin 29. The forward end of floating arm rod member 27 carries a bushing 30 in which a shaft 31 rotates on a transverse horizontal axis. A propeller type cutting knife or blade 32 is secured to one end of shaft 31 to rotate thereon in a generally vertical plane. A blade guard 32A is mounted on bushing 30 adjacent blade 32 for safety and to support a guide or miter wheel, as hereinafter described.

A pulley 33 is secured to the opposite end of shaft 31 and is connected by means of belt drive 34 or similar drive means to pulley 35 secured to the motor drive shaft 20. It will be seen that the axis of rotation of shaft 31 is spaced from but parallel to the common axis of motor drive shaft 20 and the pivoting axis of floating arm 21 on shaft 24. Belt 34 will drive pulley 33 and cutting blade 32 on shaft 31 regardless of relative raising or lowering of the floating arm 21. Tension on belt 34 is created by spring 28. When properly tensioned, rod member 27 is desirably locked in place against rotation within tube 22 by means of threaded set screw clamp 36 at the rearward end of tube 22. A hand grip 37 permits easy operation and adjustment of the locking means.

A guide or miter wheel 38 is journaled to rotate on an axis 39 carried at the lower end of a rod or bar 40 which is telescopically supported in a sleeve 41 carried by a bracket 42 supported from blade guard 32A and bushing 30. The guide wheel is broad and flat, desirably with little or no tread. When the machine is used it travels on the tracton wheel pushed by the operator so that the guide wheel hugs the edge being trimmed. Guide wheel 38 determines both depth of cut of the blade 32 and the movement of the floating arm carrying the cutting blade relative to the frame and traction wheel of the machine, as determined by variations in terrain. A threaded clamping or locking set screw means 43 having a hand grip 44 for easy operation and adjustment makes it possible to readily change the depth of cut.

Figure 5:
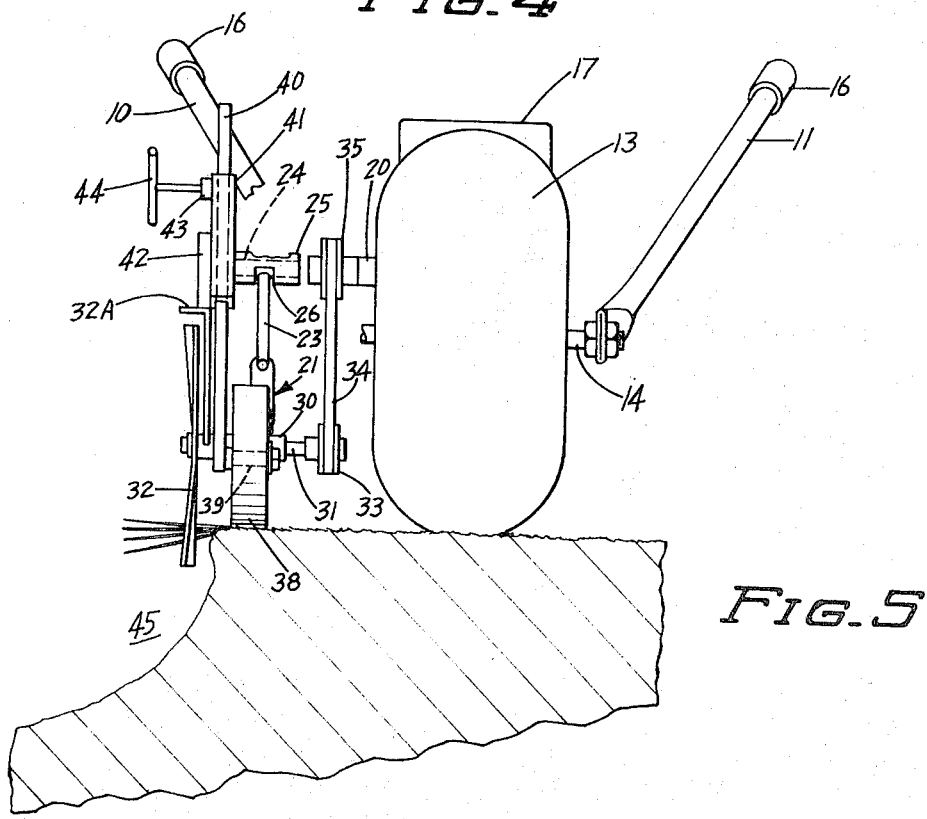
FIG. 5 is a fragmentary front elevation on an enlarged scale with parts broken away to show underlying structure and showing the machine on level terrain.

The location and elevation of the cutting blade 32 by the guide wheel 38 relative to traction wheel 13 to compensate for variations in terrain is best understood by comparison of FIGS. 5, 6 and 7. FIG. 5 shows level terrain adjacent the edge of the sand trap 45. FIG. 6 shows the ground rising away from the edge of the sand trap and FIG. 7 shows the ground falling away from the edge of the sand trap. Yet, the position of the cutting blade guided by wheel 38 following the ground immediately adjacent the edge of the sand trap is the same in each instance. The floating arm pivots on its shaft 24 to raise and lower the cutting blade 32 to the proper position as determined by guide wheel 38 independent of the elevation of the traction wheel 13.

When the machine is not in use, the entire floating arm, along with the cutting blade and guide wheel mechanism, is raised out of operating position and held by means of rod 46 which is secured to the tubular portion 22 of the floating arm 21 and extends through a bracket 47 secured to the right hand side bar 10. Manual set screw clamping means 48 is easily tightened to hold the floating arm mechanism in its elevated position. When the floating arm is lowered, the clamping means 48 remains out of engagement with rod 46 to permit that rod to freely slide through bracket 47. Rod 46 is desirably threaded and a nut 49 at its upper end provides an adjustable stop to limit the extent to which the floating arm 21 and associated mechanism can be lowered.

The sand trap trimmer, according to the present invention, is easily handled and operated. An unskilled inexperienced workman can be trained in its operation in a matter of a few minutes. Although shown for right hand operation, a corresponding left handed model can be readily constructed. The unit is no more difficult to handle and maneuver than a wheelbarrow. Ninety degree turns can readily be executed. Although intended to be both operated and propelled manually, the machine can readily be made self-propelled.

The floating arm is ordinarily secured by means of rod 46, bracket 47 and clamping means 48 to hold the lowermost edge of the cutting blade above ground level for storage of the unit and easy movement to the work area. Then, the position of guide wheel 38 is adjusted to provide the desired cutting depth. The motor is started and the machine is guided around the sand trap or other area to be trimmed. The machine is driven and steered by traction wheel 13 with guide wheel 38 on the turf immediately adjacent the edge to be trimmed. Regardless or irregularities in terrain, the guide wheel 38 hugs the edge without ever disengaging from the turf and without the blade ever undercutting the edge being trimmed.

The turf around sand traps is seldom uniform and regular. For this reason, it is often desired to momentarily change the depth of cut or position of the cutting blade 32. This may be accomplished by manipulating the handles 16 to tip the entire machine about fulcrum points at the points of engagement between the ground and the traction wheel 13 and/or miter wheel 38. For example, the depth of cut of blade 32 may be reduced by lifting up on the handles. The blade 32 may be lifted out of cutting position to avoid some obstruction by lifting on the right hand handle and tilting the entire machine to the left. If the turf is on an overhanging edge, a slight undercutting effect can be achieved by lifting on the left hand handle and tilting the machine to the right. The overall wheelbarrow design permits great maneuverability and easy adaptation to variations in terrain.

It is apparent that many modifications and variations of this invention as hereinbefore set forth may be made without departing from the spirit and scope thereof. The specific embodiments described are given by way of example only and the invention is limited only by the terms of the appended claims.

We claim:
1. A grass trimming machine comprising:
(A) a longitudinally extending frame;
(B) a single traction wheel journaled for rotation about a transverse horizontal axis in the forward end of said frame, said traction wheel providing substantially the sole ground support for said machine in operation;
(C) handle means at the opposite end of said frame,
(D) leg members depending from said frame intermediate of its ends;
(E) power means having a power take-off supported from said frame intermediate of its ends, the power take-off being rotatable on a transverse horizontal axis;
(F) a floating arm pivotally supported at one end from said frame to rotate on said power take-off axis independently of said power means;
(G) a grass cutting blade supported at the opposite end of said arm and mounted to rotate in a vertical plane on an axis parallel to the axis of pivotal rotation;
(H) drive means connecting said power take-off and grass cutting blade to rotate the blade; and
(I) an adjustably mounted guide wheel on the end of said arm adjacent said cutting blade, said guide wheel being spaced from and parallel to said traction wheel and independently rotatable about a transverse horizontal axis parallel to the axis of the cutting blade.

2. A grass trimming machine according to claim 1 further characterized in that said floating arm is elongated, extends longitudinally relative to the frame along one side thereof, and is pivotally attached at its rearward end to said frame.

3. A grass trimming machine according to claim 2 further characterized in that said cutting blade is supported at the forward end of the floating arm, the axis of rotation of said blade and the axis of rotation of the traction wheel lying in a common generally vertical plane.

4. A grass trimming machine according to claim 2 further characterized in that said floating arm includes an upwardly extending rigid arm, a bracket on said frame to be slidably engaged by said rigid arm, said bracket including locking means to secure said floating arm against movement.

5. A grass trimming machine according to claim 2 further characterized in that said guide wheel is mounted on said floating arm forward of and spaced inward from said cutting blade.

6. A grass trimming machine according to claim 5 further characterized in that said guide wheel is vertically adjustable relative to said cutting blade.

References Cited

UNITED STATES PATENTS

| | | | |
|---|---|---|---|
| 2,619,785 | 12/1952 | Botimer | 56—121.46 |
| 2,847,813 | 8/1958 | Hanson et al. | 56—25.4 |
| 3,193,996 | 7/1965 | Wellborn | 56—256 |

ROBERT PESHOCK, Primary Examiner

J. N. ESKOVITZ, Assistant Examiner

U.S. Cl. X.R.

172—15